United States Patent [19]

Kubbat et al.

[11] Patent Number: 5,420,582
[45] Date of Patent: May 30, 1995

[54] METHOD AND APPARATUS FOR DISPLAYING FLIGHT-MANAGEMENT INFORMATION

[75] Inventors: Wolfgang Kubbat, Jugenheim; Heinrich Mensen, Frankfurt am Main; Christian Below, Berlin; Heribert Kling, Frankfurt; Harro von Viebahn, Darmstadt-Eberstadt, all of Germany

[73] Assignee: VDO Luftfahrtgeräte Werk GmbH, Frankfurt am Main, Germany

[21] Appl. No.: 127,411

[22] Filed: Sep. 27, 1993

Related U.S. Application Data

[63] Continuation of Ser. No. 583,222, Sep. 14, 1990, abandoned.

[30] Foreign Application Priority Data

Sep. 15, 1989 [DE] Germany .................. 39 30 862.6

[51] Int. Cl.$^6$ .................................................. G01C 21/00
[52] U.S. Cl. .................................... 340/974; 340/973; 340/975
[58] Field of Search ............ 340/961, 967, 968, 970, 340/971, 972, 973, 974, 975, 976, 977, 978, 979, 980; 364/460, 461, 428, 439, 429, 430, 434; 342/29, 33

[56] References Cited

U.S. PATENT DOCUMENTS

| | | |
|---|---|---|
| 3,037,382 | 6/1962 | Aid et al. . |
| 3,382,351 | 5/1968 | Schweighofer et al. ........... 340/972 |
| 3,577,120 | 5/1971 | Sherbert Jr. . |
| 3,605,083 | 9/1971 | Kramer . |
| 3,711,826 | 1/1973 | La Russa . |
| 3,784,969 | 1/1974 | Wilckens et al. .................. 340/972 |
| 3,853,081 | 12/1974 | Daudelin et al. . |
| 4,021,009 | 5/1977 | Baker et al. . |
| 4,043,194 | 8/1977 | Tanner . |
| 4,081,209 | 3/1978 | Heller et al. ......................... 350/174 |
| 4,121,246 | 10/1978 | Fadden et al. ...................... 340/972 |
| 4,146,780 | 3/1979 | Sprey . |
| 4,247,843 | 1/1981 | Miller et al. ......................... 340/721 |
| 4,283,705 | 8/1981 | James et al. . |
| 4,368,517 | 1/1983 | Lovering . |
| 4,419,079 | 12/1983 | Georges et al. .................... 340/973 |
| 4,454,496 | 6/1984 | Lowe . |
| 4,539,642 | 9/1985 | Mizuno et al. . |
| 4,583,094 | 4/1986 | Mosier ................................. 340/973 |
| 4,680,959 | 7/1987 | Henry et al. . |
| 4,700,302 | 10/1987 | Arakawa et al. . |
| 4,727,492 | 2/1988 | Reeve et al. . |
| 4,825,374 | 4/1989 | King et al. . |
| 4,843,554 | 6/1989 | Middleton et al. . |
| 4,858,135 | 8/1989 | Clish et al. . |
| 4,914,733 | 4/1990 | Gralnick ............................... 340/961 |
| 4,999,780 | 3/1991 | Mitchell ............................... 340/972 |
| 5,072,218 | 12/1991 | Spero et al. ......................... 340/980 |

FOREIGN PATENT DOCUMENTS

| | | |
|---|---|---|
| 0044777 | 1/1982 | European Pat. Off. . |
| 0292902 | 11/1988 | European Pat. Off. . |

OTHER PUBLICATIONS

IEEE Spectrum, Jul. 1975, pp. 28–29 "Collision-Avoidance systems".
Electro-Optical Systems Design, vol. 13, Jul. 1981, No. 7 pp. 31–41, Chicago, USA; Tebo et al; "Cockpit Displays . . . ".

(List continued on next page.)

*Primary Examiner*—Brent Swarthout
*Attorney, Agent, or Firm*—Martin A. Farber

[57] ABSTRACT

In a method and an apparatus for displaying flight management information for an aircraft, a three-dimensional display of the flight space with at least one horizon and the predicted flight path of the aircraft is effected by means of an image reproduction device. The predicted flight path is preferably displayed as a series of symbols which assume, within the flight space displayed, the predicted position and the predicted altitude of the aircraft with respect to the flight space at different points in time.

43 Claims, 11 Drawing Sheets

OTHER PUBLICATIONS

Proceedings of the 1988 IEEE International Conference on Systems Man, and Cybernetics, Aug. 8–12, 1988, vol. 1, pp. 506–509.

Journal Guidance Amer. Inst. of Aeron. & Astro. Inc. Predictor Laws for Pictorial Flight Display by A. J. Grunwald, vol. 8, No. 5, Sep.–Oct. 1985, pp. 545–552.

"Computer Graphics" by D. Foley, et al. (title page), copyright 1990 by Addison–Wesley Publ. Co., 2nd edition.

"Cockpit Displays–Works of Ingenuity & Splendor" A. R. Tebo, et al, Band 13, NR. 7, Jul. 1981 pp. 31–41 Chicago.

EOSD–Electro–Optical Systems Design.

Computer Graphics by James D. Foley et al, copyright 1990 by Addison–Wesley Publishing Company Inc. 2nd edition, pp. 229–251, 806–809, 855–899, 922–965, 744–753, title p. 7 contents pgs.

Thesis of Heribert Kling, Nov. 12, 1990, pp. 1–5, 118–149.

US Department of Transportation Federal Aviation Administration, Introduction to TCAS II, Mar. 1990, pp. 1–22.

METHOD AND APPARATUS FOR DISPLAYING FLIGHT-MANAGEMENT INFORMATION

RELATED APPLICATION

This application is a continuation of our application Ser. No. 07/583,222, filed Sep. 14, 1990, now abandoned.

FIELD AND BACKGROUND OF THE INVENTION

The present invention relates to a method and apparatus for displaying flight-management information in an aircraft.

In the cockpit of an aircraft a great deal of information which is relevant for piloting the aircraft is displayed to the pilot, for which purpose there exist the customary instruments consisting of a large number of indicating instruments and control lights which in modern aircraft are also substantially supplemented and/or replaced by display screens (cathode ray tubes and LCD displays).

In order for the pilot to absorb the information indicated there is required a sequential scanning of the instruments in accordance with a scheme which has been learned, and the mental combining of the information so as to form an overall picture of the flight situation. This procedure of absorbing and processing information must be constantly repeated in order to be able to observe and control the course of the flight.

With the introduction of display screens, the displaying of information has been improved but the displays for flying position and navigation remained separate.

SUMMARY OF THE INVENTION

It is the object of the present invention to improve the indication of data required for flight management in such a manner that the absorbing and processing of the information are simplified.

The method of the invention employs a three-dimensional display of the flight space with at least one horizon, and the precalculated flight path of the aircraft is effected with the aid of image reproducing means.

The term "flight space" designates the three-dimensional environment which comprises the air space in front of the aircraft as well as relevant parts of the ground which must therefore also possibly be displayed on the screen. The displaying of the three-dimensional environment takes place as "inside-out-view," by which the position of the aircraft can be related to other objects in space.

The method of the invention improves the process of transmitting information by an image which simulates natural viewing habits so that the mental load on the pilot is also reduced. Furthermore the symbols used represent integral information which makes control of attitude and movement in space as well as compliance with the preset flight path data and short-time navigation possible. As a result of the display method, the qualitative information is placed in the foreground and is supplemented by the necessary quantitative information. The task of the pilot is facilitated due to a combining of the individual information relevant for the flight phase in an ergonomically favorably developed overall picture.

Furthermore, the method of the invention makes predictive control of the aircraft possible, the consequences of the inputting of a control being directly recognizable. Any possible undesired developments— for instance, stalling upon takeoff—can be recognized and avoided before they actually occur. The time available for response by the pilot is lengthened and safety is thus increased.

In one further development of the invention, the predicted flight path is displayed for a distance over which the aircraft travels within a preset period of time, preferably a few seconds. Aside from the fact that the predicted flight path cannot be calculated with the required degree of probability for a path of any desired length, the further development of the invention results in the advantage that the length of the predicted flight path displayed already is an approximate indication of the speed.

In accordance with another further development it is proposed to have the display of the predicted flight path include the predicted position and the predicted attitude of the aircraft as a function of the time.

A particularly clear picture of the predicted behavior of the aircraft is obtained in accordance with another further development from the fact that the display of the predicted flight path consists of a series of symbols which assume, within the flight space shown, the predicted position and the predicted attitude of the aircraft in relation to the flight space at different times.

It is preferable here that a first symbol with respect to altitude and attitude in accordance with the predicted flight path be calculated, that the alignment of the first symbol take place in accordance with the actual heading, and that additional symbols be aligned in accordance with the predicted course over the ground.

One advantageous development of the invention consists in the fact that, in each case, one symbol is formed by a triangular disk of finite thickness which lies in the predicted path of the extended landing gear, one tip pointing in the predicted direction of flight. This shape of the symbol makes it possible in particularly simple manner to recognize attitude and direction of the aircraft at the times in question.

In accordance with another further development of the invention, the symbols are given a color in accordance with the predicted speed. The symbols have, in particular, a first color within one normal speed range, a second color within the range of the lower limit speed and a third color within the range of the upper limit speed.

This further development makes corrective control possible in due time in the event that with the maintaining of the control inputs present at the time, the speed should approach one of the limit values within the next six to eight seconds. For example, the pilot is warned of stalling without having to look at another instrument or another display device. For this purpose, the prediction of the speed is preferably effected on basis of the measured true air speed.

A dangerous flight situation can result due to wind shear when landing with a strong head wind which, however, does not extend all the way to the ground. An early warning of wind shear for the pilot is possible by the blinking and/or a change in color of at least a part of the predicted flight path displayed.

For this purpose the true air speed is preferably measured continuously. The wind-shear warning is then given upon a change in the true air speed which is not the result of control input. The giving of a wind-shear warning can be restricted to relevant flight phases. The giving of a wind shear warning is furthermore known per se.

In accordance with another further development it is proposed to have the display of the air space include a display of the ground and that there be shown on the ground the shadow of the symbols created by an imaginary source of light arranged vertically above the symbols.

By means of this further development, the pilot can note the altitude above the ground without having to look at another instrument. The pilot will, in particular, be in a position to effect at the proper time the control inputs required during the pull-out immediately prior to touchdown. He can therefore, for example, reduce the speed very accurately at the prescribed altitude by observing the distance between the shadow and the first symbol, which represents the first predicted position of the aircraft, as well as the color of the symbols.

It can furthermore be provided that a warning signal is given off when the tip of the predicted flight path and the shadow coincide. The warning signal preferably consists at least of a blinking and/or change in color of the predicted flight path in the region of the tip. In this way a warning prior to contact with the ground is possible.

Various methods are possible for computing the predicted flight path when using the method of the invention. The predicted flight path can, in particular, be computed from the actual data (speed, heading, altitude, rate of climb, attitude angle) and the accelerations acting on the aircraft or on basis of a mathematical model, the actual data and the control inputs (rudder positions, power plant output). The mathematical model can in this case furthermore be improved by measuring the control variables and the behavior of the aircraft during flight. The method of neuronal networks can furthermore be used for predicting the flight path.

In addition to the advantageous development of the display of the predicted flight path, the three-dimensional display of the flight space can also be developed further within the scope of the invention and be adapted to various requirements. An improvement in orientation is in, particular, achieved in the manner that the three-dimensional display of the flight space comprises a ground grid fixed to the earth, which is aligned geographically or magnetically and that the lines forming the grid have, referred to the flight space, a constant spacing, preferably one nautical mile or one geodetic angular minute.

There is furthermore advisedly provided a display of the runway or runways present in each case. The runway can be supplemented by the center line in the approach direction of the runway and/or by displaying a prescribed-path channel for a landing approach. Additional ground features, such as mountains, buildings, taxiways and traffic routes can also be included in the three-dimensional display of the flight space.

In order to achieve a display of the terrain in the region of the horizon which is as natural as possible, it is proposed, in accordance with a further development of the invention, that the grid not extend up to the horizon and that the color of the surface remaining between the grid and the horizon be adapted to the color impression resulting from the color of the ground and the narrowing lines of the grid.

The grid, which lies on the ground, becomes smaller with increasing altitude of flight so that it can be seen less clearly at high altitudes. It is therefore proposed, in accordance with another further development of the invention, that there be provided a maximum predetermined altitude difference between the position of the aircraft and the grid, in such a manner that with a flight altitude above this maximum altitude difference, the grid is lifted off from the ground shown and is carried along with the position of the aircraft in the predetermined altitude difference with respect to the altitude. The altitude difference is in this case advisedly predetermined in such a manner that the grid still has a size which can easily be evaluated.

In order to prevent pilot errors as to the altitude, parts of the grid which float above the ground can be given a different color than parts which rest on the ground. Furthermore, in this way, ground elevations which are higher than the grid carried along with the altitude of flight stand out clearly.

If, in accordance with one advantageous embodiment of the invention, the grid is displayed while taking into account the elevations of the ground, then in case of a "lifting-off" of the grid from the ground upon the exceeding of a predetermined flight altitude, the lower portions of the ground are covered by a flat grid and then, with increasing flight altitude, the higher portions. In this way, mountain peaks can easily be recognized if their height is relevant with respect to the flight altitude.

In order to give a clear warning of ground elevations, it can be proposed as an alternative that the grid, if it touches the ground at at least one point of the flight space shown, be marked by a different color than if it floats completely above the ground.

For further orientation it is proposed, in accordance with another further development of the invention, that navigation aids on the ground in the flight space displayed also be indicated. In particular, fixed points which must be flown over can be displayed at the flight altitude in the manner of a frame, and be provided with a vertical connecting line to the ground. In this way it is, on the one hand, made easier for the pilot to head towards the fixed points, and, on the other hand, there is indicated to him the time of flight over a fixed point.

In order to be able better to monitor or establish a predetermined flight path, it is proposed, in accordance with another further development of the invention, that there be also displayed a frame which marks a prescribed flight path at a point which is located in front of the aircraft at a distance amounting essentially to the displayed part of the predicted flight path. When the tip of the displayed predicted flight path points into this frame (flight path director) the pilot is told thereby that with the existing control variables the aircraft will reach or maintain the prescribed flight path—aside from disturbing influences which occur and require correction by corresponding control inputs.

Communications engineering offers means for the exchange of data between several aircraft. These means, which are known per se, can be utilized in the method of the invention for transmitting data as to the predicted flight path of another aircraft, the predicted flight path of the other aircraft being projected into the display of the air space. It can be provided, in this case, that upon the dangerous proximity of the predicted flight paths, a warning signal and suggestions for a change in heading be given.

This further development constitutes a substantial improvement of known indications of a proximity warning which merely indicate the fact that dangerous proximity is possible, as well as suggestions for the direction of an evasive maneuver. With a display of both predicted flight paths and an indication of course correction, on the other hand, the pilot is advised directly of the overall context and therefore also of the consequences of any evasion in the direction proposed.

The orientation on basis of the grid displayed at higher altitudes can, in accordance with another development, also be improved by the fact that above a predetermined altitude a second grid is displaced above the ground. In order to make it easier for the pilot to control whether a fixed plane of flight is being maintained, the second grid can represent a fixed flight plane and be marked with the altitude of the flight plane.

It is, in particular, possible to display additional information with the method of the invention, in the form of scales and alphanumerical indications. It can, in this case, be provided in particularly advantageous manner, among other things, that a horizontally-extending scale is provided for the heading, it having a first marker for the heading flown at the time and a second marker which indicates the heading which will be reached as predicted in accordance with a reference line which was started at the moment of display of the second marker.

Various image display devices can furthermore be used in advantageous manner for the method of the invention. The use of two-dimensional display screens is possible, such as, for instance, a cathode ray tube, an LCD or a plasma arrangement.

Means for three-dimensional display can also be used within the scope of the invention—for instance holographic methods or stereoscopic methods with a separate image display device for left and right eyes. With respect to the latter, devices for attachment to the head of the pilot (helmet mounted) are known.

BRIEF DESCRIPTION OF THE DRAWINGS

The invention permits numerous embodiments. A few of them are shown diagrammatically in the drawing on the basis of several figures and are described below. In the drawing.

Identical parts in the figures have been provided with the same reference numbers.

DETAILED DESCRIPTION OF THE PREFERRED EMBODIMENTS

Figure 1:
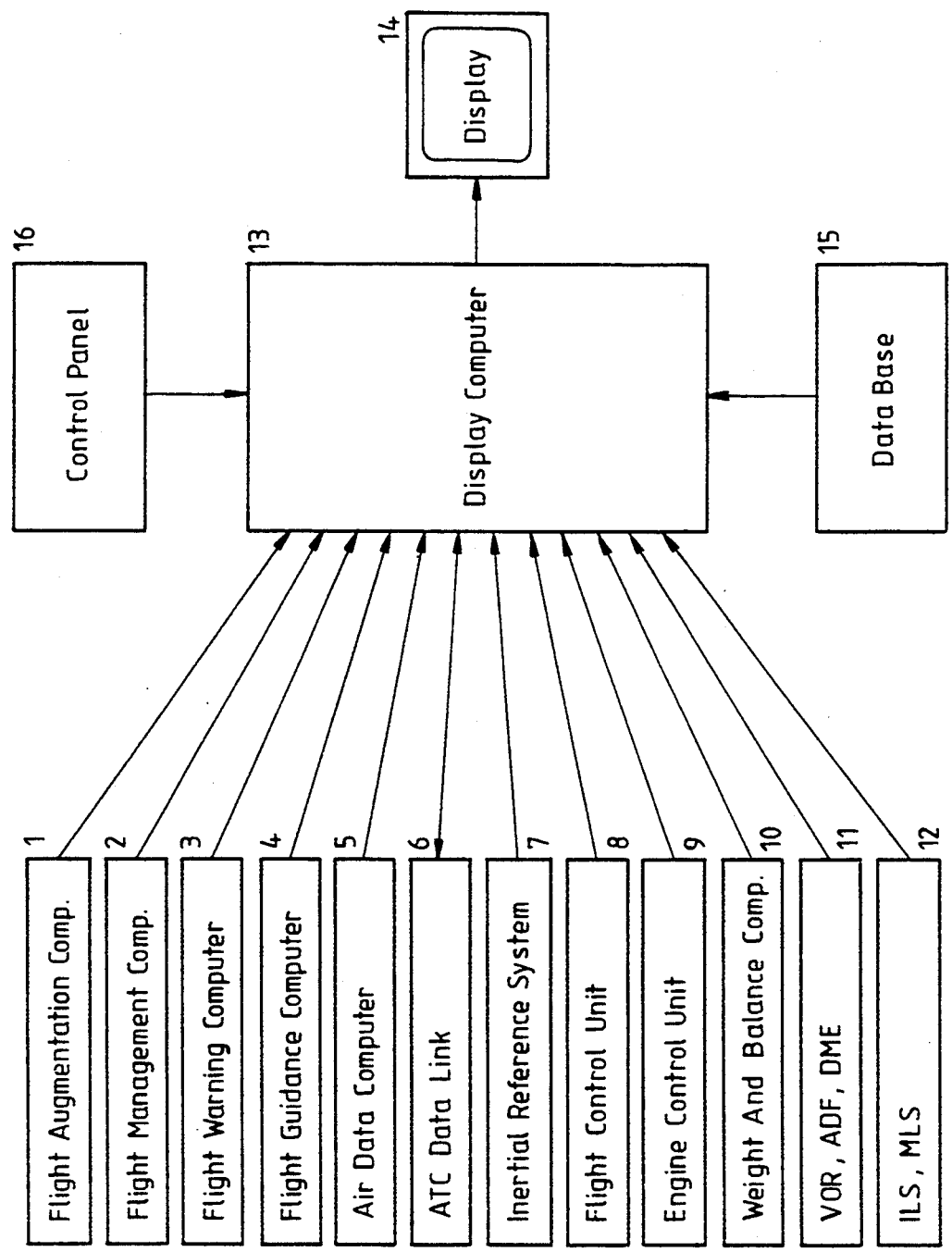
FIG. 1 is a block diagram of an information and monitoring system of a modern commercial aircraft with a device for carrying out the method of the invention.

In the block diagram of FIG. 1, units 1 to 12 are computer and control apparatus known per se in commercial aircraft, which transmit information to the apparatus for carrying out the method of the invention—hereinafter referred to as display computer 13.

A monitor 14, a memory 15 and a control panel 16 are connected to the display computer 13. From the information fed the display computer 13 by the units 1 to 12 there are computed in advance, in the display computer, the data on the development of the flight within, in each case, 6 to 8 seconds. Together with other data, for instance data on geographic conditions, the data are then processed into symbols which are, in turn, converted into video signals and fed to the monitor 14. Like the known units 1 to 12, there are also present, for reasons of safety, multiple display computers 13, monitors 14, memories 15 and control panels 16.

Depending on the circumstances in the individual case, the units 1 to 12 can feed the following information to the display computer 13:

| | |
|---|---|
| Flight augmentation computer 1 | Limit speeds |
| Flight management computer 2 | Navigation data, Headings |
| Flight warning computer 3 | Data which are required for safety monitoring, such as angular position and its limit values |
| Flight guidance computer 4 | Navigation data |
| Air data computer 5 | Dynamic pressure, actual atmospheric pressure |
| ATC data link 6 | Information from air traffic control points and other aircraft |
| Inertial reference system 7 | Position, heading, accelerations |
| Flight control unit 8 | Autopilot functions |
| Engine control unit 9 | RPM, output of engines |
| Weight and balance computer 10 | Weight and balance of the aircraft |
| VOR, ADF, DME 11 | Direction and distance of radio beacons |
| ILS, MLS 12 | Data of instrument landing systems |

The monitor 14 is preferably a color monitor. However, in FIGS. 2 to 10 the display images are indicated as monochrome drawings.

Figure 2:
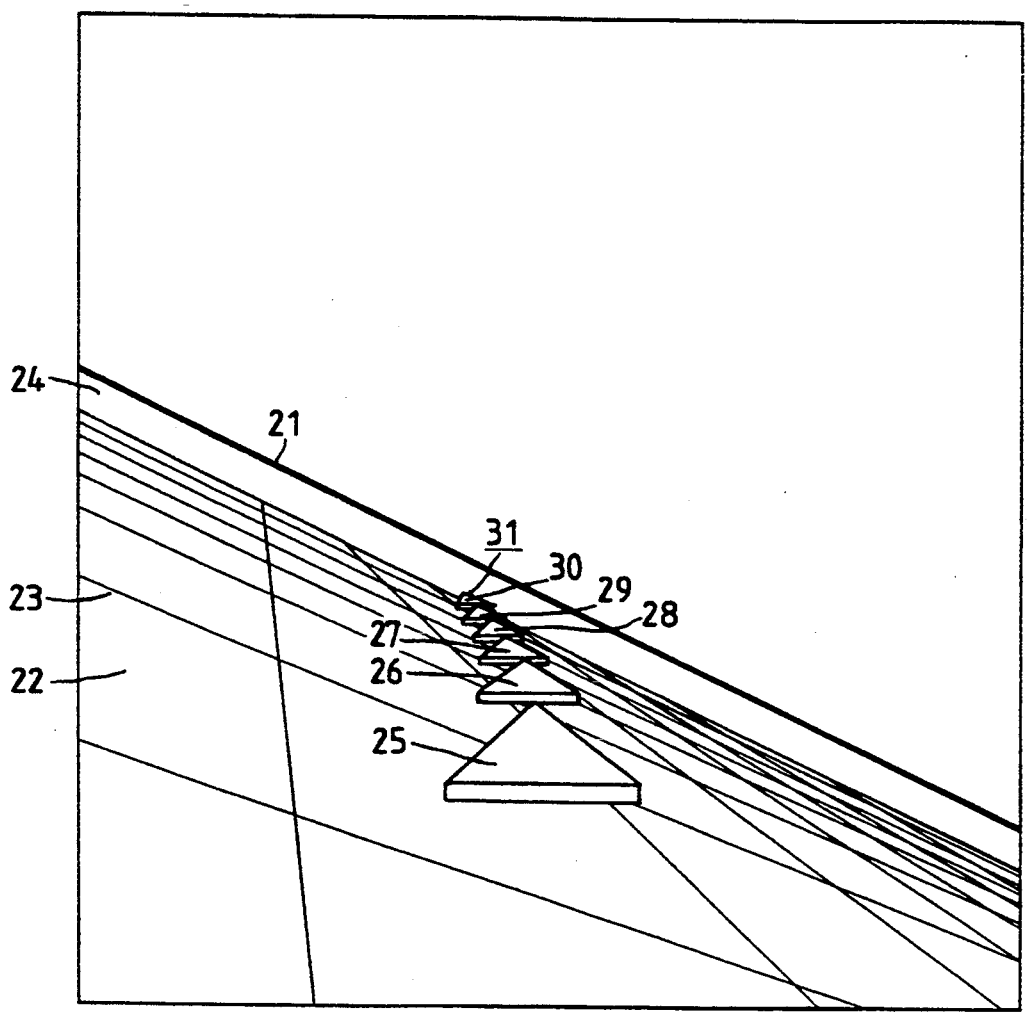
FIGS. 2 to 8 show displays of indications in accordance with the method of the invention with different information and different flight situations.

FIG. 2 shows a display image while the aircraft is banking towards the left. The horizon 21 is accordingly in an oblique position. The ground (surface of the earth) is flat in the example shown and covered by a grid 23 which is aligned from north-to-south, for instance in accordance with the magnetic poles. The distance between the grid lines is predetermined and can be selected in one preferred embodiment of the invention as one nautical mile or one geodetic angular minute.

Since with the perspective showing the number of grid lines becomes very large in the region of the horizon, it would be necessary without additional measures to calculate a large number of grid lines which, for reasons of resolution could no longer be shown in any event. In accordance with a further development of the invention, it is therefore proposed no longer to calculate and display any lines in a surface region 24 in front of the horizon but to give the surface region 24 a color which is adapted to the color impression resulting from the color of the ground and from the narrowing lines of the grid.

In the embodiments shown, the predicted flight path is indicated by triangular disks 25 to 30. The individual disks 25 to 30 represent, in this case, the predicted position, the altitude, the heading and the attitude of the aircraft. The sum of the disk-shaped symbols 25 to 30, i.e. the entire displayed part of the predicted flight path, will in the following be referred to as predictor 31.

In addition to the information mentioned above, the pilot is given an impression of the speed, due to the fact that the extension of the individual symbols 25 to 30 in the direction of the flight and thus the entire length of the predictor depend upon the speed. Additional speed information is given by the color, in the manner that within a non-critical speed range the surfaces of the symbols have the first color, for instance green, while upon approaching impermissibly high or impermissibly low speeds, the color of those symbols for which such speeds are predicted changes into a corresponding warning color, for instance red and orange.

Since it is, after all, of interest to the pilot where the aircraft is flying, the predictor 31 as a whole is directed in accordance with the predicted heading above ground. However, since the course steered is also important information for the pilot—particularly when landing with a cross wind—the first symbol 25 of the predictor 31 is aligned in accordance with the course steered.

Due to the fact that the symbols 25 to 30 are not displayed as surfaces but as disks of predetermined thickness, a substantial improvement in the spatial impression results. In one actual embodiment, the visible edges, which are shown in black in the figures, are colored dark green.

Figure 3:
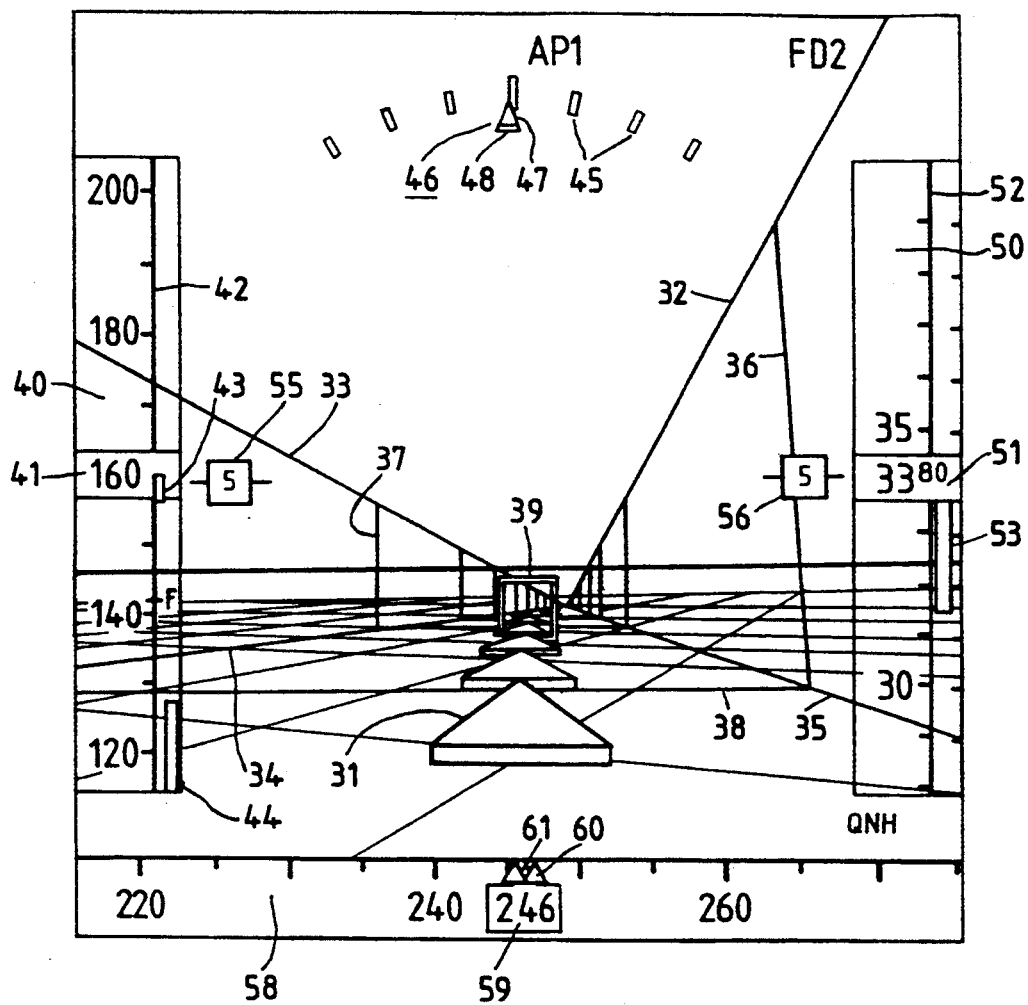

FIG. 3 shows another screen picture, which represents a different flight situation than FIG. 2 and which furthermore indicates additional information in the screen picture in the form of scales, pointers and alphanumerical displays. The flight situation shown corresponds to a landing approach with the aircraft being in an approach channel the limits of which are represented by corresponding straight lines of which merely the straight lines 32 to 38 are provided with reference numbers. For display of the approach channel 32 to 38, the display computer 13 (FIG. 1) is fed the corresponding data for the airport in question from the memory 15 and the unit 12.

The screen display of FIG. 3 furthermore shows a frame 39, which will be referred to in the following as flight path director and is produced on a predetermined flight path at a distance in front of the aircraft at which the tip of the predictor 31 lies. The pilot can thus carry out his control inputs in such a manner that the tip of the predictor 31 lies within the flight path director 39. The flight path director 39 thus "flies" in front of the aircraft on the predetermined flight path.

The additional indications visible in the screen of FIG. 3 will now be explained. An area 40 is provided along the left edge of the display screen for the speed. The speed is shown in the field 41 numerically in knots. A vertical scale 42 is displaced in such a manner as a function of the speed that the numerical indication is shown above the corresponding place on the scale. A bar 43 serves as indicator of the trend of the speed, which is slightly negative in the case of the screen picture of FIG. 3. Furthermore an F is displayed in the image alongside the scale 42 in order to indicate that at this speed the landing flaps must be extended.

An additional bar 44 extends from the lower end of the area 40 and indicates the lower critical limit speed which must be avoided in the instantaneous flight situation. The bar 44 is accordingly given a striking color, for instance red.

The marks 45 displayed in the upper part of the screen together with a pointer 46 represent a roll-angle indication. An upper part 47 of the pointer 46 indicates the angle of roll while a lower part 48 serves as slip-skid indicator. Above the roll-angle indicator there is provided a line with alphanumeric symbols which contain information on the autopilot. In the flight situation shown in FIG. 3 for instance, the autopilot AP1 is switched on. Furthermore the flight director FD2 is operating.

Information on the flight altitude is shown in an area 50 along the right edge of the screen image. The flight altitude at the time is indicated numerically in feet within a central field 51. A scale 52 appears to extend vertically behind the field 51 and moves as a function of the altitude in such manner that the numerical indication appears in front of the corresponding place on the scale. The length of a bar 53 extending from the field 51 represents the variometer indication. In the case of FIG. 3 a descent of the aircraft is indicated. The combination of letters QNH below the area 50 indicates the mode set for the altimeter.

In order to indicate the pitch angle, two markers 55, 56 are provided which indicate the pitch angle, on the one hand by their position with respect to the horizon and on the other hand numerically.

In the lower region of the screen picture there is provided a horizontally extending scale 58 to indicate the heading. This scale also has a fixed field 59 in the same way as in the case of the altitude and speed indicators, the field 59 numerically indicating the course steered (heading). For this purpose, the scale 58 is moved in suitable manner in horizontal direction. Additional markers 60, 61 will be explained in further detail below with reference to FIG. 6.

Figure 4:
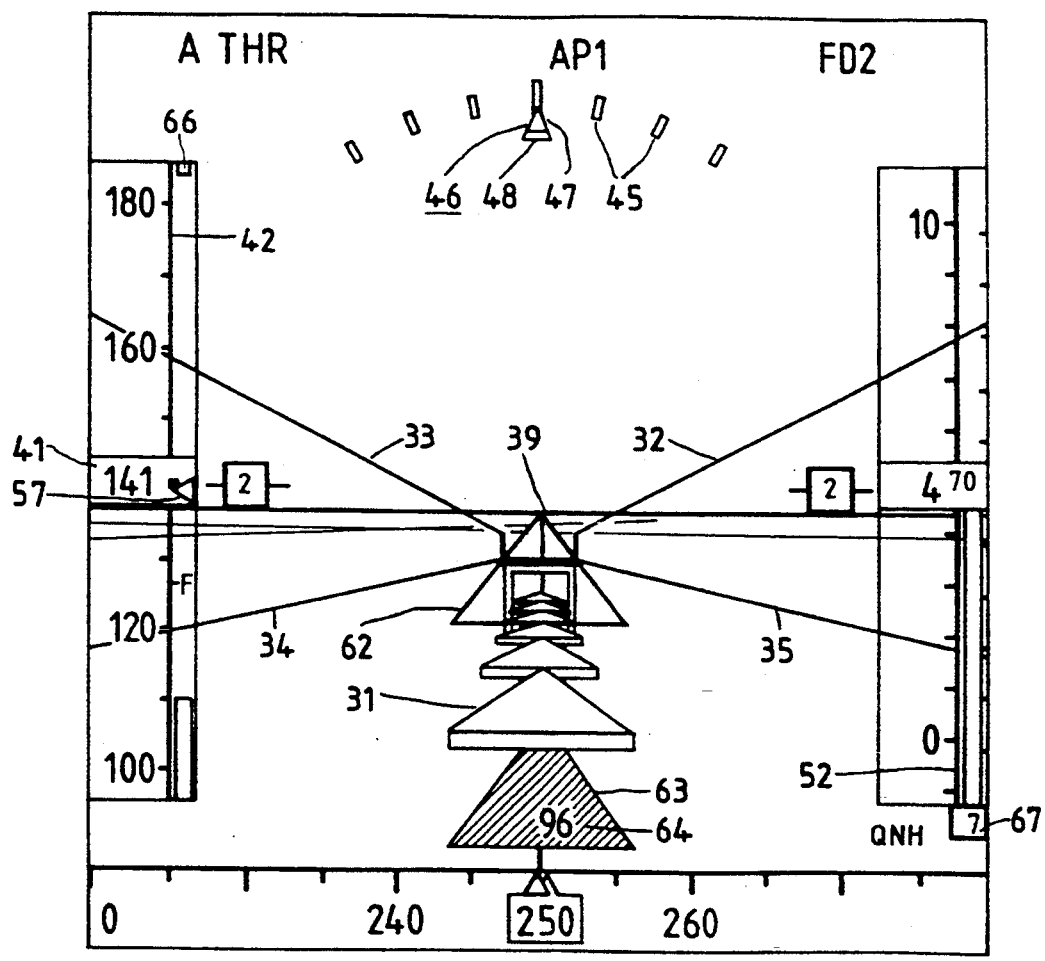

The screen image of FIG. 4 shows a later phase of the landing approach than FIG. 3. In this case the runway 62, the last part of the approach channel 32 to 35, and the flight path director 39 can be recognized. If the aircraft drops below a predetermined altitude, a shadow 63 of the predictor 31 becomes visible on the screen. The shadow 63 gives the pilot information as to the altitude and the predicted altitude without it being necessary to concentrate on another instrument. In connection with the change in the color of the symbols of the predictor 31 in the region of the lower permissible speed, the pilot can at a glance gather all necessary information shortly prior to touchdown.

As compared with the additional information shown in the screen picture, further information can be noted from FIG. 4 due to the different flight situation. Thus a triangle 57 can be noted in the field 41 for the speed indication, the triangle representing the prescribed speed when the autopilot is on. Another bar 66 is visible on the upper end of the scale 42, the bar representing the upper permissible speed resulting from the flight situation at the time. Furthermore a field 67 is provided on the lower end of the scale 52, this field indicating numerically the rate of descent if its exceeds a certain value.

FIG. 5 again shows the flight path director 39 in case of banking towards the left. This figure shows that the aircraft will fly past the flight path director on the predicted flight path unless the pilot flies a tighter curve. Furthermore the bar 43 indicates an acceleration and the bar 53 a descent.

Figure 5:
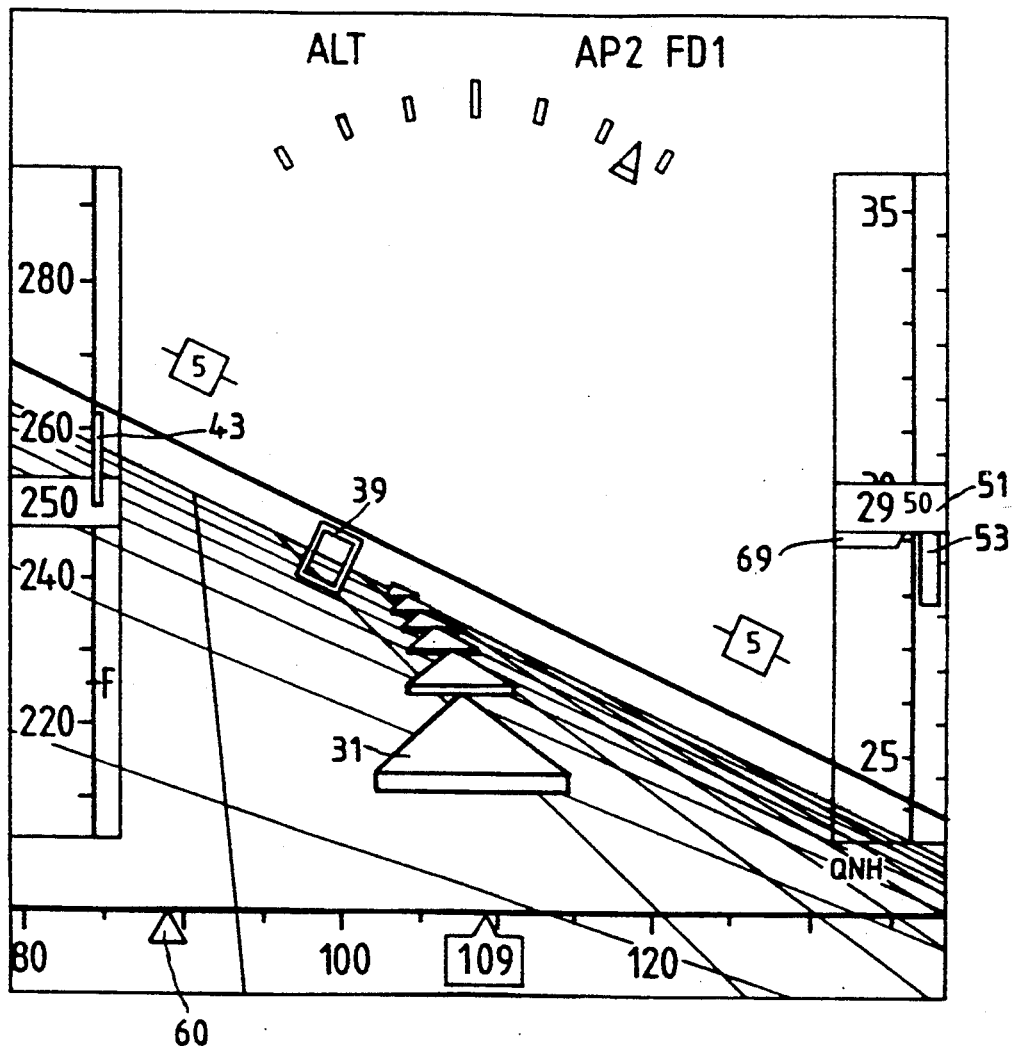

In the screen picture of FIG. 5 the heading at the time is 109°. A marker 60 points to about 89°. This heading is the heading which the aircraft flies if a standard pullout maneuver is commenced at the time shown. Another field 69 extends in part below the field 51, the field 69 indicating the prescribed flight altitude set for the autopilot. If the prescribed flight altitude is accurately maintained, the marker 69 disappears behind the field 51.

Figure 6:
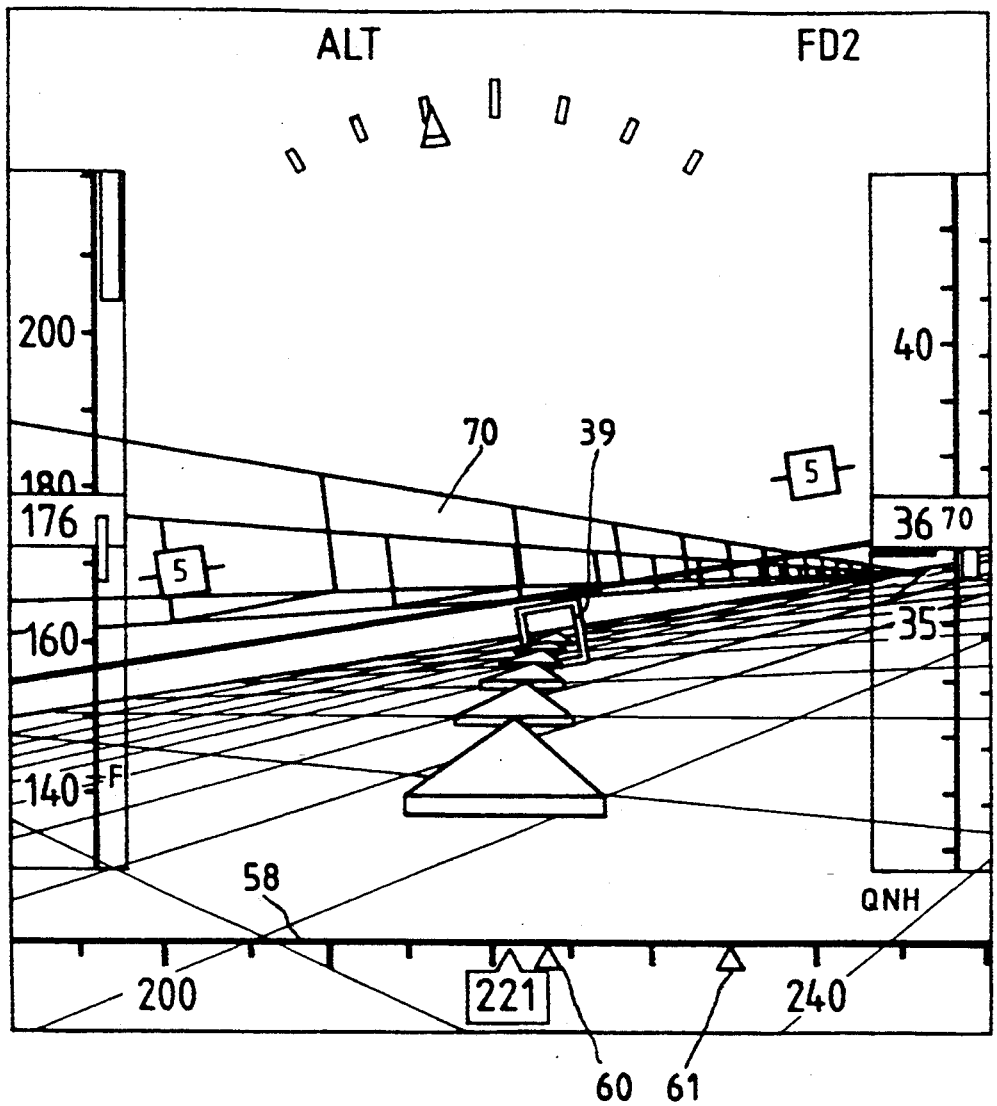

In the flight situation shown in FIG. 6 the approach channel 70 shown is to be reached by banking towards the right on a prescribed flight path. For this purpose, a flight path director 39 is produced by means of the apparatus of the invention. The pilot can observe and predict the effect of his control inputs with respect to the flight path director 39 and thus fly the prescribed curve in excellent approximation, with a minimum of correcting inputs. In addition to the marker 60, there can also be noted on the screen picture of FIG. 6 another marker 61, which points towards a point on the scale 58. By means of this marker a selected heading which was previously input can be indicated.

Figure 7:
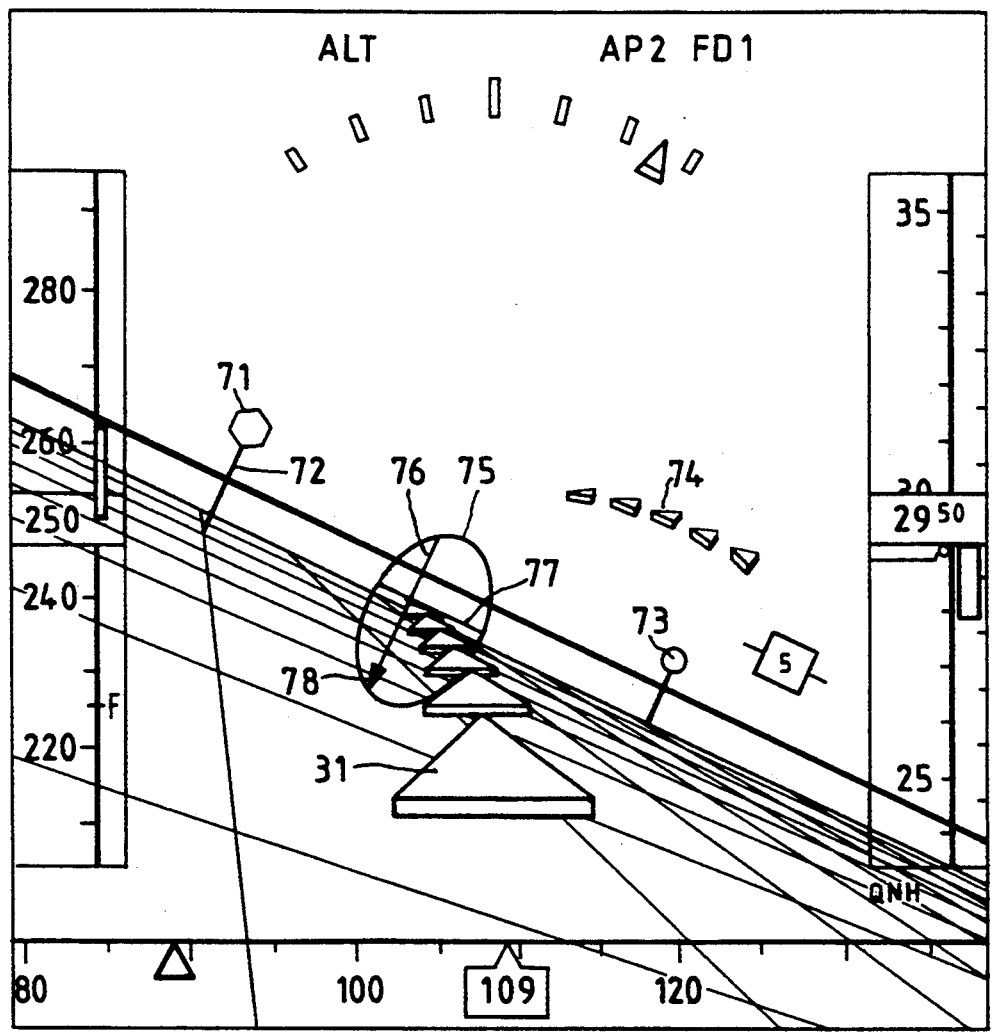

In addition to the displays already explained, the screen image of FIG. 7 shows navigation aids on the ground which are indicated as frames 71, 73 each of which is connected to the ground by a line 72. Due to this connection, the pilot can estimate well the location of the navigational aid. Furthermore, the navigational aids are indicated by frames 71, 73 of different shape. Thus, for instance, a hexagonal frame can indicate a VOR and a circular frame a NDB. By steering the aircraft in accordance with the predictor 31, the pilot can, on the one hand, fly very precisely over the navigational aid and, on the other hand, there can be readily noticed by the pilot the time of overflight which is about one second after the symbol 15 which is last in time passes through the frame 71.

Furthermore, in the screen display of FIG. 7 there is visible, in addition to the predictor 31 which represents the predicted flight path of one's own aircraft, another predictor 74 which is obtained from information on the predicted flight path of another aircraft. If the predicted flight paths approach each other more than is permissible at at least one point in time, then this will be indicated to the pilot by the change in color and/or blinking of the symbols in question. It can be useful here if the pilot can form a picture of the potential flight paths referred to the flight situation at that time.

Therefore, in accordance with a further development of the invention, it is proposed that the limits of the space which the aircraft can reach be computed and displayed three-dimensionally. One example thereof is also shown in FIG. 7, the limits of the space which can be reached by the aircraft being shown as an ellipse 75 which comprises the predicted flight path displayed. As additional information there are provided horizontal and vertical paths 76, 77 which intersect the flight path. An arrow 78 suggests an evasive maneuver to the pilot.

Figure 8:
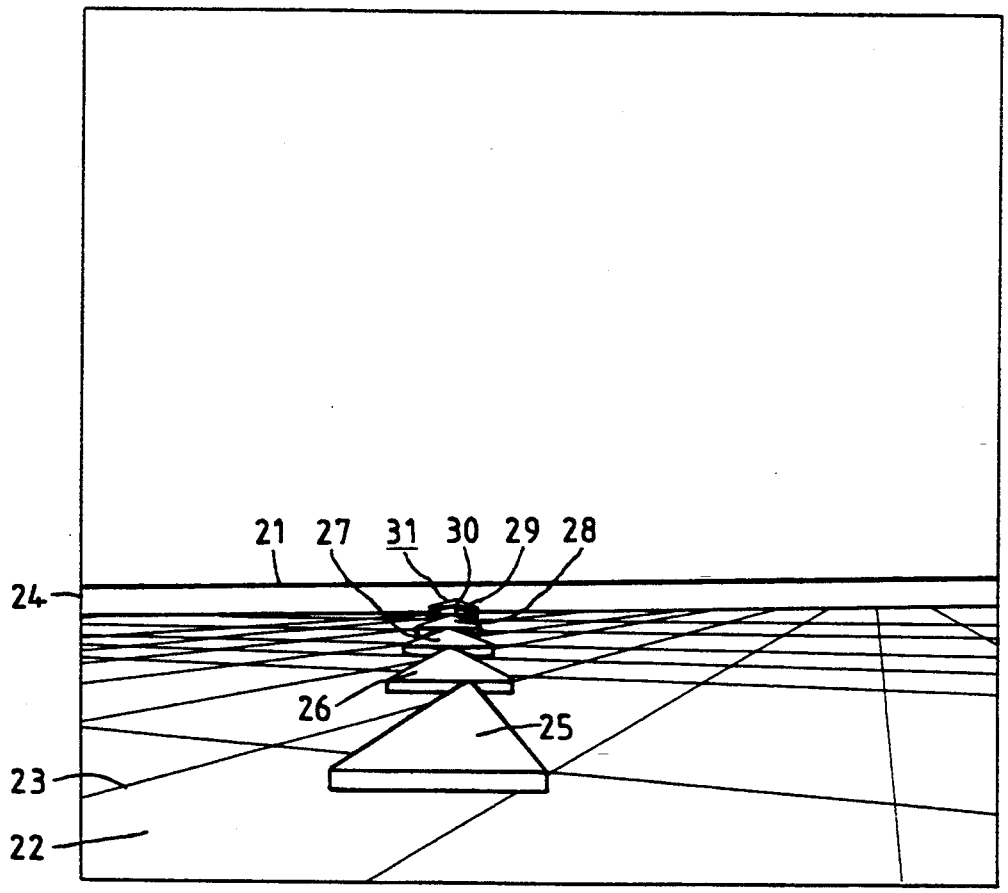

FIG. 8 shows a screen image having a predictor 31 the first symbol 25 of which is aligned in accordance with the heading. The additional symbols 26 to 30 are aligned in accordance with the course above ground.

Figure 9:
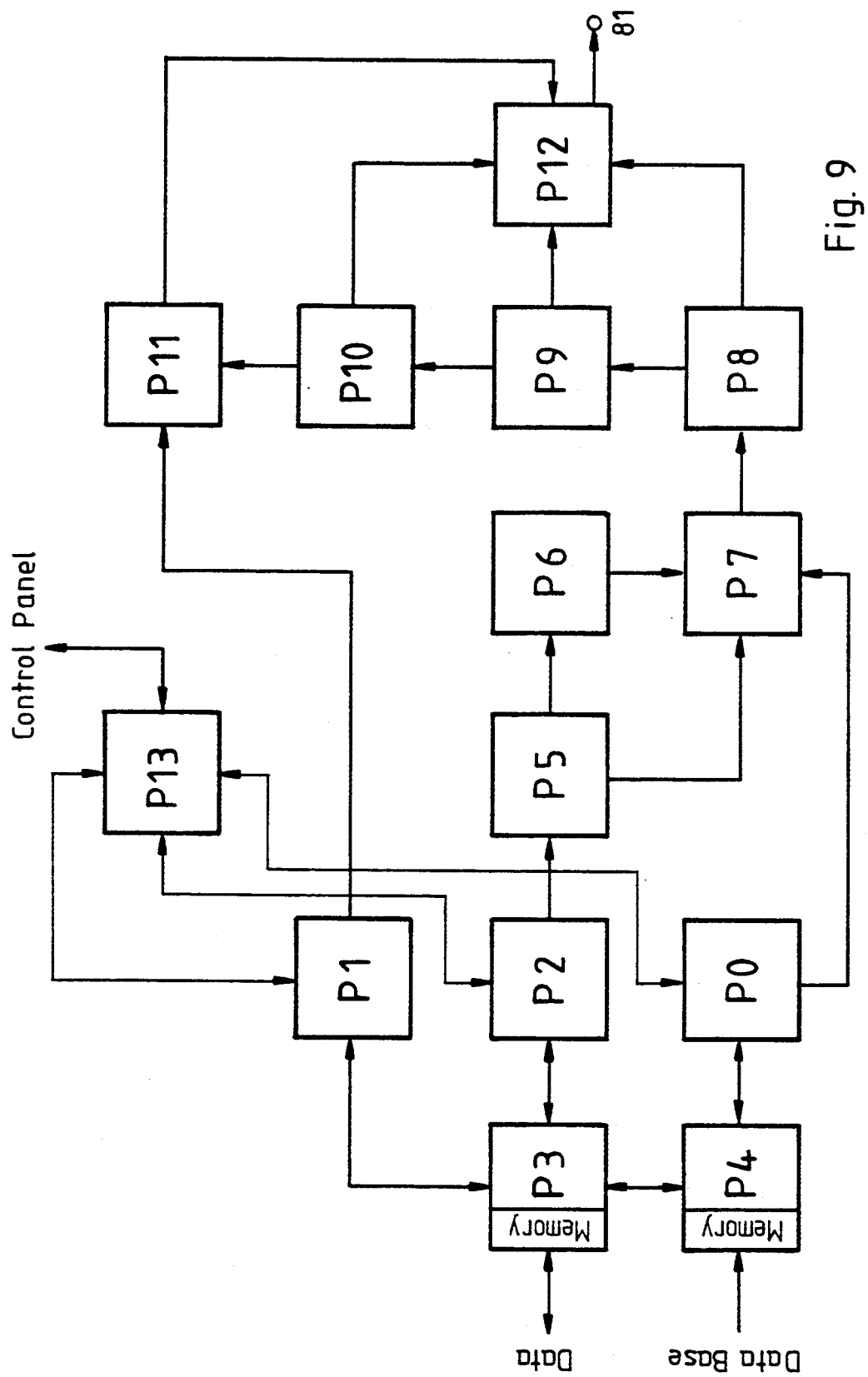
FIG. 9 is a block diagram of a device for carrying out the method of the invention, and FIG. 10 comprises FIGS. 10a and 10b on separate sheets, and is diagram of a program for the device for carrying out the method of the invention.
Figure 10:
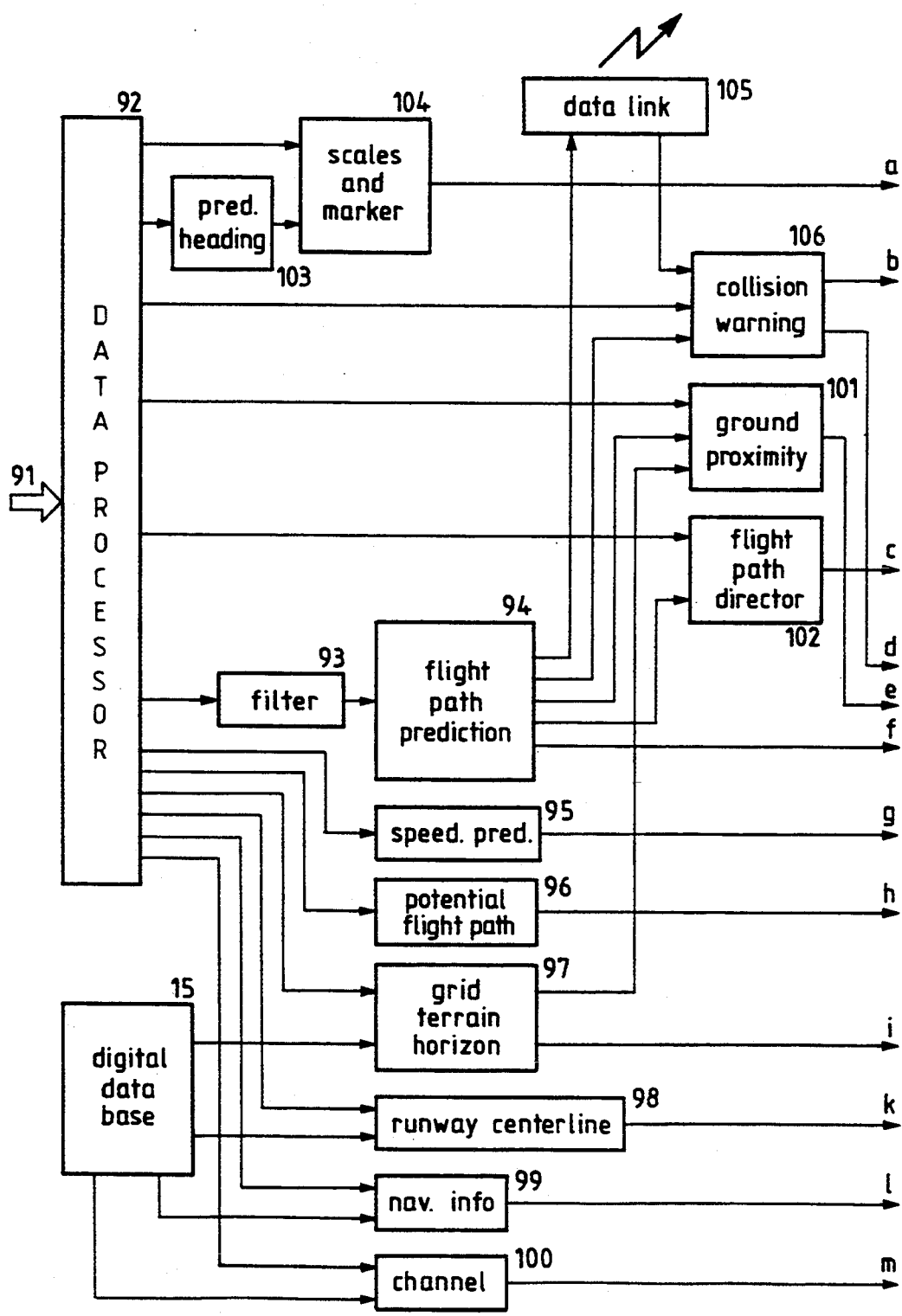
Figure 10:
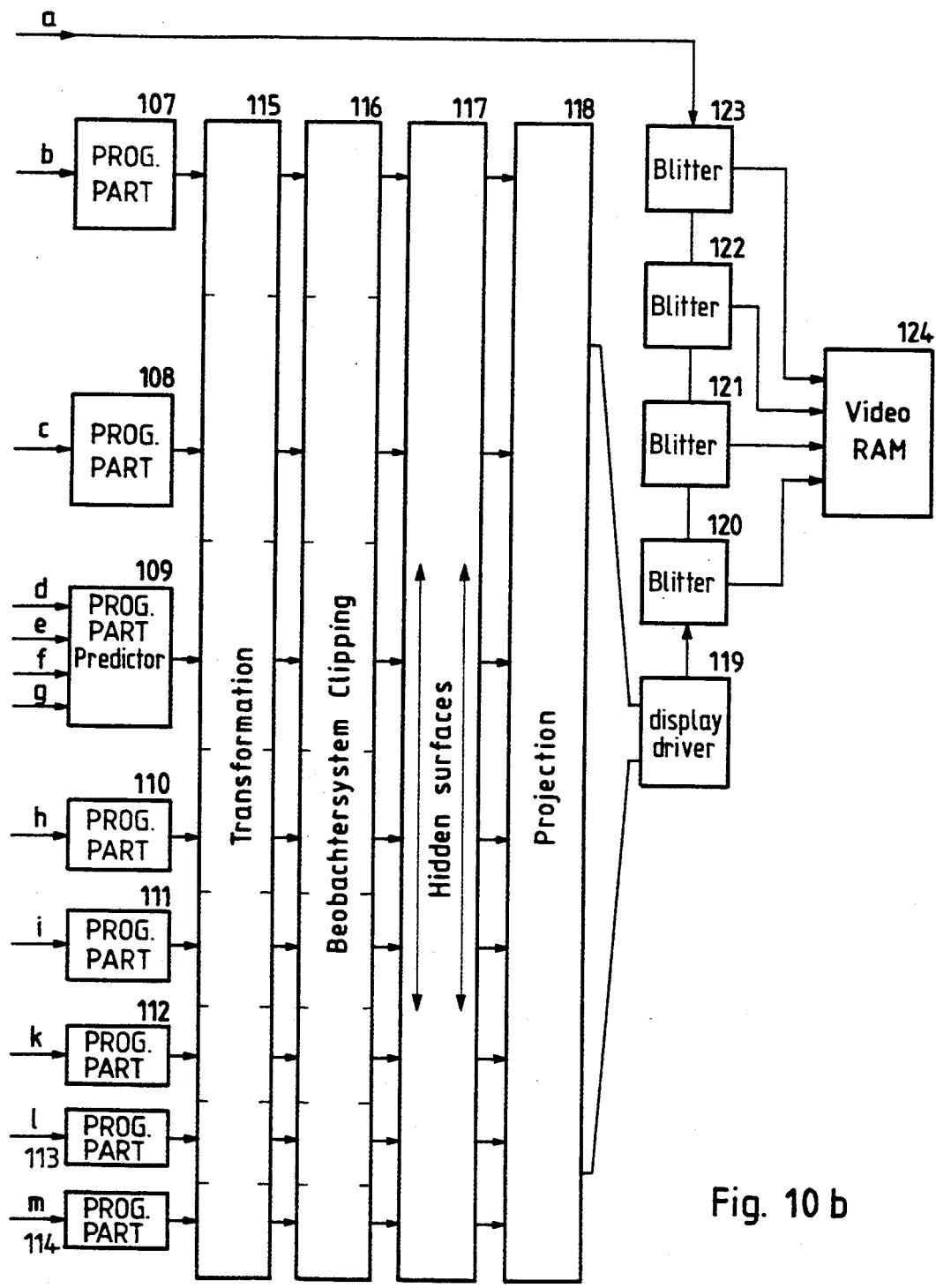

FIG. 9 shows, as block diagram, an embodiment for the display computer 13 (FIG. 1) which consists essentially of fourteen so-called transputers P0 to P13. There are suitable, for instance, transputers of the type INMOS T 800 and of the type INMOS T 212 of INMOS Ltd. Transputers are processors which are characterized by simple bus-free communication with each other. Depending on the application, a multiple-processor network which is adapted to the required computing capacity can be configured and used for parallel data transmission and processing.

Program modules are placed on the processors of the network, the modules communicating with each other via link interfaces. A standard language, OCCAM, developed for transputers—described, for instance, in R. Steinmetz: OCCAM2, 2nd edition, Hüthig Publishing Company, Heidelberg 1988—supports the bus-less network concept by language constructs by means of which so-called software channels can be agreed upon over which data can be transmitted to other processors in simple manner. A software channel connects two generally parallel processors. Information on the programming of transputers can furthermore be found in numerous publications of INMOS Ltd.

The data fed by the units 1–12 (FIG. 1) are first of all temporarily stored in a memory associated with the processor P3. The processor P3 takes over the time control in order to assure data consistency between the units connected and the display computer. Furthermore, by means of the processor P3 there are effected data conversions and a logical distribution of the variables for further processing through the processors P0, P1, P2. A memory associated with the processor P4 serves to take over data from the memory 15 (data base, FIG. 1). The processor P13 controls the flow of data from and to the control panel 16 (FIG. 1).

A scene model is first of all produced in a symbol generator which is formed by the processors P0, P2, P5, P6 and P7, the scene model being explained in detail below with reference to FIG. 9. The processors P8 to P11 take over the task of a raster scan conversion of the three-dimensional symbolic elements. The processor P12 reads the four equally large image areas produced in the processors P8 to P11 into the image memory region. The video signals can be taken from the output 81 of the display computer.

The diagram shown in FIGS. 10a and b indicates essentially the data flow and the most important steps for data processing. Lines which belong together are in this case designated identically from small a to small m. At 91 the data from the units 1 to 12 (FIG. 1) are fed and temporarily stored, converted and distributed over different processors in a suitable manner at 92. Data which are required for predicting the flight path are first of all filtered at 93 and then fed for the computing of the predicted flight path 94. The filtering has essentially a low-pass characteristic and serves to suppress interferences which do not contribute in meaningful manner to the predicting of the flight path. Parallel thereto, the speed is predicted in a program part 95, while a program part 96 serves to compute the flight paths which can be reached.

The information as to the territory to be flown over at the time is read out from the memory 15 and, together with flight information, such as the heading and altitude, serves to compute the grid, the horizon and other features of the ground in the program part 97. At 98 the center line of the runway is also computed by means of data read out from the memory 15 and by means of flight information. At 99, information on navigational aids is read out from the memory 15 and related to flight information. Finally, in the program part 100 the computing of the approach channel is effected in a similar manner.

Using the data computed in program parts 94 to 100 and various flight information, data for a ground approach warning and for a flight path director are generated at 101 and 102. At 103 a heading is predicted from the actual flight data, which heading is reached upon pulling out of a curve after reduction of the actual angle of roll at a standard roll rate (standard pulling out). This heading and additional flight data are fed to a program part 104 for the computing of the scales and numerical display.

The predicted flight path data are fed from the program part 94 to a device 105 for data transmission so that the predicted flight path can also be displayed in other aircraft or in air traffic control stations. Furthermore, by means of the device 105, data can be received from an aircraft which is in the vicinity and be processed in the program part 106 together with the data of one's own predicted flight path and one's own flight data to create a collision warning. A symbol generator which is formed by the program parts 107 to 114 creates a scene model which comprises elements such as the predictor 31, the prescribed-path channel 70, the runway 62, the ground grid 23 and the horizon 21. These elements are formulated as three-dimensional edge or surface models in world coordinates and transformed in the subsequent program part 115 into a common reference system, using the current attitude and position data.

In detail, the predictor is generated at 109, for which purpose data on the predicted flight path which essentially determine the shape of the predictor are fed from 94, while the data fed from 95 on the predicted speed affect the length of the predictor and the coloring. The coloring is also influenced by data which are fed from the collision warning 106, in which connection a symbol as suggestion for an evasive maneuver is possibly generated in a program part (not shown). Finally, the data fed from the program part 101 serve, together with the data already mentioned above, to create the shadow of the predictor. The other program parts 108 and 110 to 114 compute respectively the symbols flight path director 39 (FIG. 3), potential flight path 76 (FIG. 7), grid 23, horizon 21 and possibly other ground features, runway center line, navigational aid 71 (FIG. 7) and approach channel 70 (FIG. 6).

After transformation of the symbols into a common reference system at 115, the transformed scene model is converted into the three-dimensional observer system with the design-eye-point as origin. Following this, the portions of the symbolic elements visible by the observer are determined. For this, so-called clipping algorithms are used in program part 116, the algorithms suppressing invisible polygon and line segments. Thereafter, in the case of objects limited to the volume of vision, edges and surfaces which are not visible to the observer are suppressed in the program part 117. While the transformation and the conversion into a three-dimensional observer system take place separately for the individual symbols, there must be taken into account upon the suppression of the invisible edges and surfaces, the relationship of the symbols with respect to each other which is indicated by vertical arrows in the showing of program part 117.

A projection of the symbols onto the screen image plane is effected in the program part 118. Thereafter the data flow is conducted via a display driver 119 to the devices for the conversion of the data into a video signal, the blitters 120 to 123. The blitter 123 receives, in addition, the data produced by the program part 104 on scales, pointers and alphanumeric symbols. Since these data are displayed two-dimensionally, the processing steps 107 to 119 are not required for this. The signals produced by the blitters 120 to 123 are combined in a video storage 124 and can then be fed to the monitor 14 (FIG. 1).

We claim:

1. A method for displaying flight management information including predicted flight path and a predicted position and a predicted attitude for an aircraft, wherein data of said predicted flight path has been previously computed from aircraft speed, altitude, heading and acceleration, comprising steps of;
   providing a three-dimensional display of air space;
   employing an image reproduction device to present in the display at least one horizon and the predicted flight path of the aircraft;
   calculating predicted position and predicted attitude of the aircraft from aircraft speed, altitude, heading and acceleration;
   including in the display or the predicted flight path the predicted position and the predicted attitude of the aircraft at various points in time in a series of predicted positions along the predicted flight path;
   identifying each of a plurality of predicted positions of the aircraft by a symbol to produce a series of the symbols, each of the symbols having a common predetermined configuration in the form of a three-dimensioned object extending along the predicted flight path, the size of each symbol decreasing with increasing distance from the aircraft along the flight path;
   orienting each of the symbols to have an orientation corresponding to a predicted attitude of the aircraft at each of the predicted positions of the aircraft; and
   wherein each of said symbols is configured as a solid object having a top surface and a side surface visible on the display, the symbols being viewed from a position above the flight path.

2. A method according to claim 1, wherein the display of a predicted flight path is effected for a section of the path which the aircraft travels over within a predetermined period of time, having a duration of approximately a few seconds.

3. A method according to claim 2, wherein the series of symbols, within a displayed flight space, assume the predicted position and the predicted attitude of the aircraft with respect to the flight space at various points in time.

4. A method according to claim 3, wherein said flight management information includes predicted heading, the method further comprising steps of
   computing a first of the symbols with respect to altitude and attitude in accordance with the predicted flight path;
   aligning the first of the symbols in accordance with the actual heading of the aircraft; and
   presenting additional ones of the symbols which are aligned in accordance with a predicted ground track.

5. A method according to claim 4, wherein
   each of the symbols is formed by a triangular disk of finite thickness which lies in the predicted path of an extended landing gear, one tip pointing in the predicted direction of flight.

6. A method according to claim 3, wherein said flight management information includes predicted speed of an aircraft, and
   wherein the symbols are given colors which are a function of aircraft speed predicted for respective ones of the symbols.

7. A method according to claim 6, wherein the symbols have a first color within a normal speed range, a second color within the range of the lower limit speed and a third color within the range of the upper limit speed.

8. A method according to claim 6, further comprising a step of predicting the speed from true air speed measured.

9. A method according to claim 1, wherein said flight management information includes wind shear, the method further comprising a step of indicating the existence of wind shear by blinking and/or by changing color of at least a part of the display.

10. A method according to claim 1, wherein the predicted flight path is based on a calculation from actual data, including speed, heading, altitude, rate of climb, attitude angle, and the acceleration acting on the aircraft.

11. A method according to claim 1, wherein the predicted flight path is based on control inputs including rudder position, and engine output.

12. A method according to claim 1, further comprising a step of providing a display of the ground.

13. A method according to claim 12, further comprising steps of showing a three-dimensional display of flight space including a ground grid which is aligned geographically or magnetically; and forming the lines of a grid in the display with a constant spacing of preferably one nautical mile or one geodetic angular minute.

14. A method according to claim 13, wherein the display of the flight space comprises a display of an existing runway.

15. A method according to claim 14, further comprising a step of including furthermore the center line of the runway, the center line being shown extended in the direction of the approach.

16. A method according to claim 13, wherein the three-dimensional display of the flight space includes a display of a prescribed-path channel for a landing approach.

17. A method according to claim 13, further comprising a step of presenting additional ground features of a set of features consisting of mountains, buildings, taxiways, and traffic routes within the three-dimensional display of the flight space.

18. A method according to claim 13, wherein a color of a surface disposed between the grid and the horizon is a mixture of the color of the ground and the converging lines of the grid.

19. A method according to claim 13, further comprising a step of showing a part of the grid with one color, and a remaining part of the grid with a second color different from the first color.

20. A method according to claim 13, further comprising a step of coloring a portion of a part of the grid which touches the ground at one place with a color different from a remainder of said grid part.

21. A method according to claim 13, wherein the grid is located at an altitude higher than elevations of the ground.

22. A method according to claim 13, further comprising a step of presenting ground navigation facilities in the display of flight space.

23. A method according to claim 22, further comprising a step of showing fixed points, to be flown over at an altitude of flight of the aircraft, in the shape of frames with a vertical connecting line to the ground.

24. A method according to claim 1, wherein a length of a part of the predicted flight path is displayed, the method further comprising a step of presenting in the display a frame which characterizes a prescribed flight path at a place which lies in front of the aircraft essentially by the length of a displayed part of the predicted flight path.

25. A method according to claim 1, further comprising steps of presenting in the display data on a predicted flight path of another aircraft, and projecting the predicted flight path of the other aircraft into the display of the air space.

26. A method according to claim 25, further comprising the step of giving, upon dangerous proximity of the predicted flight path, a warning signal and suggestions for a change in heading.

27. A method according to claim 13, further comprising a step of showing, for conditions of flight above a predetermined flight altitude, a second grid above the ground in the display.

28. A method according to claim 27, wherein the second grid represents a fixed flight plane and is characterized by the altitude of the flight plane.

29. A method according to claim 1, further comprising a step of displaying additional information in the form of alphanumeric symbols and/or scales with pointers by means of an image reproduction device.

30. A method according to claim 29, wherein the additional information comprises flight data consisting of altitude, speed, development of speed, limit speed, rate of climb/descent, heading, pitch angle, roll angle, and position of the horizon.

31. A method according to claim 29, further comprising a step of displaying warning signals by means of the image reproduction device.

32. A method according to claim 29, wherein said flight management information includes predicted heading and location for aircraft pullout, the method further comprising a step of presenting a horizontal scale for the heading, the scale having a first marker for the heading flown at the time and a second marker representing the heading which is reached as predicted in accordance with a standard pullout.

33. A method according to claim 29, further comprising a step of showing, for an indication of the pitch angle, marks in the lateral regions of the air space, which marks lie on a displayed horizon in case of level flight and are provided in addition with a numerical indication of the pitch angle.

34. A method according to claim 1, further comprising a step of designating in the three-dimensional display of the air space a maximum flight path altitude under the current flight condition.

35. An apparatus for displaying aircraft flight space and flight guidance information including predicted flight path for an aircraft, comprising
   a graphic computer and an image reproduction device operatively coupled to the computer to form a three-dimensional display of the flight space with at least one horizon and a predicted flight path of the aircraft wherein;
   the computer includes means responsive to aircraft speed, altitude, heading and acceleration for presenting predicted flight path, predicted position and predicted attitude of the aircraft in the display at various points in time in a series of positions along the predicted flight path;
   the image reproduction device provides symbols on said display
   the computer identifies a plurality of predicted positions of the aircraft by a series of the symbols, each of the symbols having a common predetermined configuration in the form of a three-dimensional object extending along the predicted flight path;
   the computer provides varying sizes for the symbols such that the sizes of the symbols decrease with increasing distance from the aircraft along the flight path;
   the symbols have orientations corresponding to a predicted attitude of the aircraft at each of the predicted positions of the aircraft; and
   wherein each of said symbols is configured as a solid object having a top surface and a side surface visible on the display, the symbols being viewed from a position above the flight path.

36. An apparatus according to claim 35, wherein the image reproduction device comprises a two-dimensional display screen formed of a cathode ray tube, an LCD or a plasma arrangement.

37. An apparatus according to claim 35, wherein the image reproduction device contains means for three-dimensional, in particular holographic, display.

38. An apparatus according to claim 35, wherein the image reproduction device produces two image displays to be fed to the respective eyes of a pilot.

39. An apparatus according to claim 38, wherein the image reproduction device further comprises devices for attachment on the head of the pilot.

40. A method according to claim 1, wherein the symbols have a triangular form, and the orienting step provides for placing the vertex of a triangle at a forward end of the symbols with respect to forward movement of the aircraft along the predicted flight path.

41. A method according to claim 40, further comprising a step of presenting a grid on the display to the grid wherein the magnitudes of the dimensions increase with decreasing altitude of the aircraft and decrease with increasing altitude of the aircraft.

42. A method according to claim 1, further comprising a step of arranging the symbols one behind the other along the predicted flight path wherein one of the symbols appears to contact a next one of the symbols.

43. An apparatus according to claim 35, wherein the symbols are arranged one behind the other along the predicted flight path, and wherein one of the symbols appears to contact a next one of the symbols.

* * * * *